June 10, 1941.  G. A. HANSMAN ET AL  2,244,977
FASTENING DEVICE
Filed Dec. 29, 1939  2 Sheets-Sheet 1
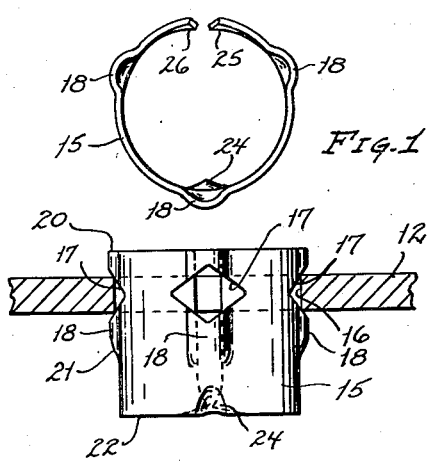
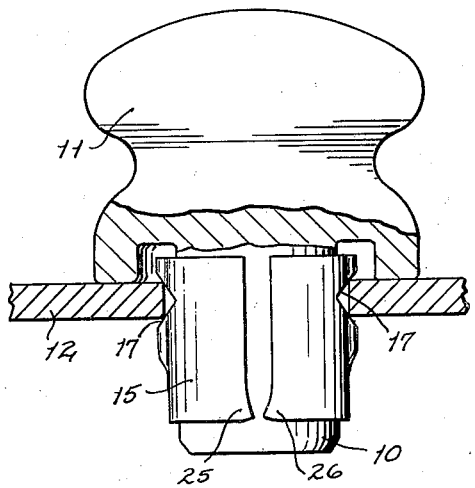
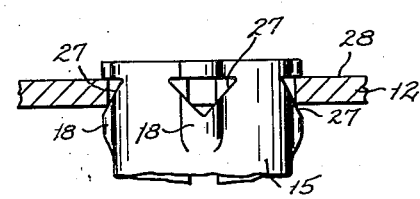
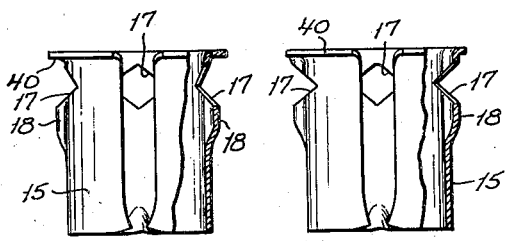
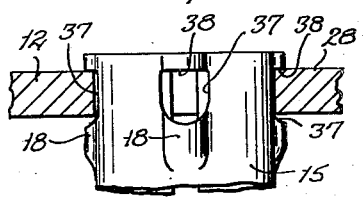
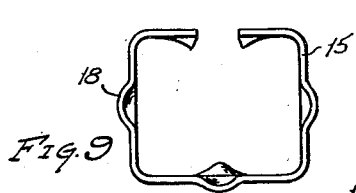
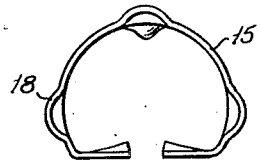
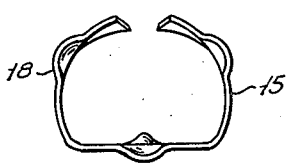
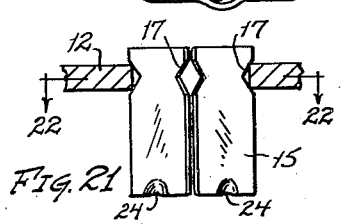
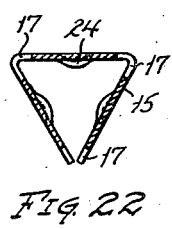
INVENTORS
GEORGE A. HANSMAN and
GEORGE A. TINNERMAN
BY Bates, Teare, & McBean
ATTORNEYS June 10, 1941.　　G. A. HANSMAN ET AL　　2,244,977
FASTENING DEVICE
Filed Dec. 29, 1939　　2 Sheets-Sheet 2

INVENTORS
GEORGE A. HANSMAN and
BY　GEORGE A. TINNERMAN
Bates, Teare, & McBean
ATTORNEYS Patented June 10, 1941

2,244,977

UNITED STATES PATENT OFFICE 2,244,977

FASTENING DEVICE

George A. Hansman, Rocky River, and George A. Tinnerman, Cleveland, Ohio, assignors to Tinnerman Products, Inc., Cleveland, Ohio, a corporation of Ohio Application December 29, 1939, Serial No. 311,548

15 Claims. (Cl. 85—36)

This invention relates to fastening devices and particularly to those that are constructed of sheet metal, cold-rolled metal and the like. The device has particular application in holding together two articles through the medium of a projection that forms a part of one of the articles and that projects through an opening in the other article. Fasteners of this character may be used, for example, in holding together articles that are made of plastic material, die castings, or any other materials that are used in commercial practice in many industries. The invention finds particular application in attaching articles to sheet metal panels which are too thin for the formation of a thread therein and which in many instances are inaccessible except from one side thereof.

An object of the present invention is to make a fastening device which may be attached to an article, such as a sheet metal panel, by insertion through an opening therein, and which when so inserted will remain automatically in position to receive the shank of another article which is to be attached to the panel. A further object is to provide a fastening device which will automatically grip the article that is inserted thereinto and which at the same time will increase the binding effect between the fastener and the panel, whereby a firm and rigid connection between the article and panel may be obtained merely by inserting the shank of the article through the fastener, as aforesaid.

An additional object is to make a fastener which will accommodate panels of a different thickness and yet will automatically maintain a secure engagement therewith regardless of the thickness that is used.

Figure 12:
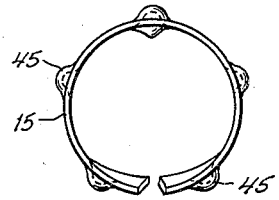
Figure 14:
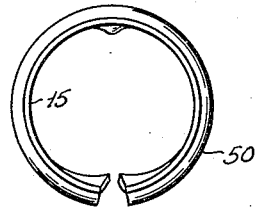
Figure 13:
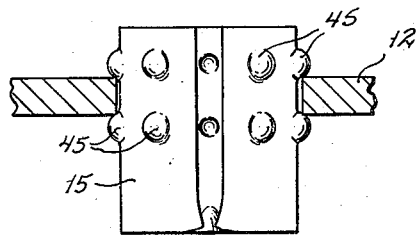
Figure 15:
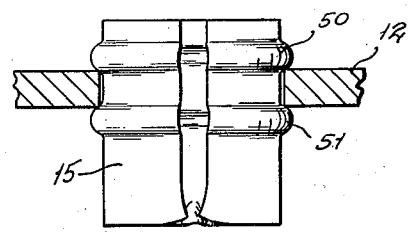

Referring now to the drawings: Fig. 1 is a top plan view of one form of fastener embodying my invention; Fig. 2 is a side elevation of the fastener showing it applied to a panel; Fig. 3 illustrates an assembly of the fastener upon the application of a part to be attached to the panel; Figs. 4 and 5 are partial side views of modified forms of fastener construction showing the fasteners attached thereto; Fig. 6 is a side view partly in section of a modified form of fastener construction; Fig. 7 is a side view of a further modified form of construction; Fig. 8 is a top plan view of the fastener shown in Fig. 7, and Figs. 9, 10, and 11 are top plan views of further modified forms of fastener construction; Fig. 12 is a top plan view of a modified form of fastener; Fig. 13 is a side elevation of the fastener shown in Fig. 12 as applied to a panel; Figs. 14 and 15 are top plan view and side elevation respectively of a further modified form of fastener construction; Figs. 16 to 20 are sectional views of the fastener showing further modified forms of construction; Fig. 21 is a side view of an additional modified construction, and Fig. 22 is a section taken on a plane indicated by the line 22—22 in Fig. 21.

The fastening device illustrated in the various figures is preferably formed from a substantially rectangular section of sheet metal or strip stock of the desired width. The blank is suitably deformed to impart the desired yielding and locking features, and is shaped to the form of a split ring, or other shaped sleeve, which is adapted to fit over a projection, such as that indicated in Fig. 3 at 10, which may be the shank of a knob 11, that is intended to be attached to a panel 12; the fastener comprising the sole means for holding the knob in locked position against the panel.

Many installations provide accessibility from only one side thereof, and many forms of assembly make it desirable to apply the fastening device to one of the articles before the other is assembled thereto. The present invention is admirably suited for solving such problem, because, as shown in Fig. 2, it may be attached to a panel and may be held automatically in self-sustaining position thereon preparatory to the reception of the article that is to be fastened to the panel. In numerous assemblies, the fastener is suited for multiple use upon a panel, before the panel is affixed in its permanent location.

The fastener which is indicated in Figs. 1, 2 and 3, has a body 15, which is formed from sheet metal to the shape substantially of a split cylinder and which may be suitably heat treated to impart resilient characteristics thereto. The cylinder is made substantially larger than the opening 16 in the panel so that the fastener must be compressed slightly to make it enter the opening, but will expand to engage the walls of the opening and be held thereagainst by spring tension.

A snap-fastening locking action is provided between the fastener and the panel by means of one or more shoulders on the fastener, which are adapted to engage the top and bottom edges of the wall of the aperture in the panel through which the fastener extends. Additionally, these shoulders are so formed that the fastener may be forced through the opening from one side of the panel until the shoulders automatically engage the panel at the proper location. The shoulders may assume various modifications, such as slots, protuberances, flexible fingers, or in some instances, a flange which cooperates with any one of the various types mentioned.

In Fig. 2, the snap-fastening locking action is provided between the fastener and the panel preferably by means of slots, such as 17, which are arranged at spaced intervals on the body adjacent one end thereof and which may be diamond-shaped, and are preferably located on ribs 18 which are formed integrally with the body of the fastener and extend in an axial direction thereof. The ribs in effect constitute corrugations which project outwardly from the body and impart strength thereto at the point of engagement with the panel.

As shown in Fig. 2, each rib 18 extends from the top edge 20 to a point 21 which is located intermediate the slots 17 and the bottom edge 22. Adjacent the point 21, each rib merges with the body along an inclined surface which provides suitable means for guiding the fastener into the opening in the panel; it being understood that in the form illustrated, the fastener is well adapted to be inserted from the side of the panel on which the knob 11 is positioned.

To make the desired snap-fastening action between the fastener and the panel, each slot 17, when made in the diamond-shape, preferably has the major axis extending peripherally and the minor axis extending axially of the fastener, and has the minor axis longer than the thickness of the panel with which the fastener is intended to be used. In this way, the walls of the slots provide tapered edges which will accommodate variations in the thickness of the panel within manufacturing tolerances. Moreover, this type of slot will accommodate panels which range in thickness up to substantially the length of the minor axis of the slot.

To lock the fastener against the shank of an article that is inserted therethrough, we prefer to provide, adjacent the lower end of the fastener, gripping means which are formed integrally therewith and which extend inwardly thereof. In Figs. 1, 2 and 3, the desired result is accomplished by indenting, as at 24, the intermediate portion of the fastener along the bottom edge thereof, and by turning the lower corners 25 and 26 inwardly. The shank of the article is sufficiently close in diameter to the internal diameter of the fastener to expand the fastener and thereby accomplish a two-fold purpose; that is, expanding the fastener against the panel, and gripping the shank of the article that is passed therethrough.

The modification shown in Fig. 4 is substantially the same as that shown in Fig. 2 except for the fact that the slots 27 are substantially triangular in shape with the top leg of each triangle disposed in substantially the same plane. In this way, the top edges bear in a common plane against the top edge 28 of the panel.

The modification shown in Fig. 5 employs D-shaped openings 37, wherein the flat portion of each D, as at 38, is positioned horizontally, and wherein all such portions are disposed in substantially the same plane so as to engage the top surface 28 of the panel in a manner somewhat similar to that illustrated in Fig. 4. The D-shaped openings have desirability in those locations where the fastener is to be used on a relatively thick panel, because the openings can lie substantially within the confines of the ribs 18.

The modification shown in Fig. 6 has a body that is formed in substantially the same manner as that shown in Fig. 2, except for the fact that the top edge has an outwardly extending flange 40 which is adapted to bear against that face of the panel on which the knob or other desired article is located. In this figure, the ribs 18 terminate beneath the flange, whereas in the modification of Fig. 7, the ribs extend through the flange. In all other respects, the fastener shown in Figs. 7 and 8 is substantially the same as that shown in Fig. 6. Additionally, it is to be understood that the various forms of openings or slots heretofore illustrated, may be used with the modifications of Figs. 6 or 7.

In Figs. 9, 10 and 11, we have shown further modifications which reside principally in the shape to which the body is formed. Thus, in Fig. 9, for example, the body has a square or rectangular form; in Fig. 10, a D-shaped formation, wherein the ends of the body are on the flat portion of the D, and in Fig. 11, a D-shaped formation wherein the end portions are on the curved portion of the D. In any of the modifications of Figs. 9 to 11, the preceding formations of openings, ribs, flange and shank gripping portions may be formed in the manner illustrated in the preceding figures.

The modifications shown in Figs. 12 to 17 include shoulders that comprise projections or protuberances which may be formed by pressing portions of the body outwardly. Thus, in Figs. 12 and 13, the shoulders are formed by portions 45 which are spaced apart in rows to accommodate the part 12 through which the fastener may be passed.

In Figs. 14 and 15, the shoulders are shown as annular ribs 50 and 51 that are formed by pressing the body outwardly, as is illustrated particularly in Fig. 15. The walls of the ribs are rounded so as to allow for variations in the thickness in the part 12 and to assure firm engagement therewith.

Figure 16:
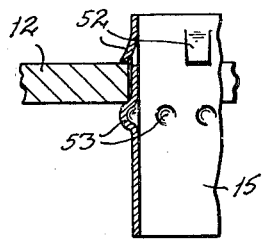
Figure 17:
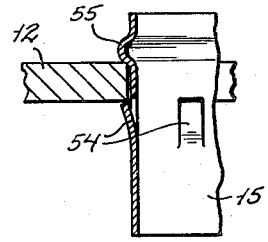

In Fig. 16 a combination of flexible fingers 52 and spaced protuberances 53 provide the coacting shoulders for engaging and holding the part 12, while in Fig. 17, the coacting fingers 54 and the annular rib 55 coact to receive and hold the part 12.

Figure 18:
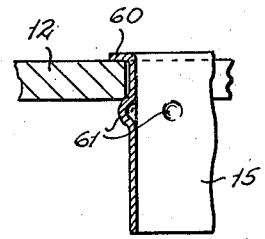
Figure 19:
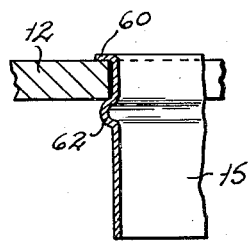
Figure 20:
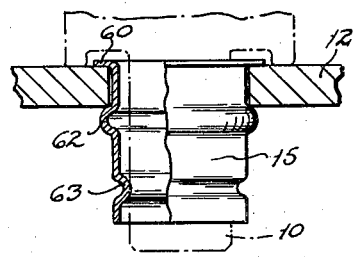

In Figs. 18 to 20, we have shown a flange 60 adjacent one end of the body and we utilize the flange for one of the article engaging shoulders. The coacting shoulders are provided, in Fig. 18, by the protuberances 61 and, in Figs. 19 and 20, by the annular rib 62. In the last named figure, the shank 10, which passes through the fastener, may be held in engagement therewith by an inwardly extending annular rib 63 which is adapted to bear against the shank and to be held thereagainst by the inherent spring tension of the metal with which the fastener is made.

The modification of Figs. 21 and 22 illustrates a fastener wherein the body 15 is triangular in shape, and wherein the panel engaging slots 17 are located adjacent the intersections of the flat faces. In this form, the shank gripping indents 24 may be positioned at the bottom of the body and on the flat faces thereof.

In all of the foregoing modifications, it is to be understood that the fastener may be locked against the shank by means of an inwardly extending portion, such as is shown and described in connection with the illustrations in Figs. 1, 2, and 3.

An important advantage of a fastener made in accordance with the present invention is the fact that it may be locked into article receiving position upon a panel, and that it will accommodate itself to slight variations in the thickness of the panel for which it is intended to be used. A fastener of this type is well suited for production line assembly work, because it may be attached to a panel at one point in an assembly line and locked automatically into position on the panel until it reaches the point where the article is to be attached. In the meantime, work can progress on the concealed part of the panel so that, at the appointed location, the article when forced into the fastener will operate automatically to lock itself to the fastener and at the same time lock the fastener more firmly against the panel.

We claim:

1. A fastening device comprising a hollow body of sheet material adapted to be passed through an opening in a support, the body having spaced slots therein, the walls of which engage the support to hold the fastener in self-sustaining position on the support.

2. A fastening device comprising a hollow body of sheet material having a slit extending generally longitudinally thereof for permitting expansibility during the insertion of an article therethrough and having spaced openings disposed therein remote from one end of the fastener, said openings providing surfaces for engaging the edge of a supporting member and for holding the fastener in self-sustaining position upon the member.

3. A fastening device comprising a hollow body of sheet material having a slit extending generally longitudinally thereof for permitting expansibility during the insertion of an article therethrough, and having means formed integrally therewith adjacent one end thereof for engaging the walls of an opening in a support through which the fastener is adapted to be passed, and having an indented portion at the opposite end and adjacent the slit for engaging and holding an article that is adapted to be inserted into the fastener.

4. A fastener comprising a hollow body of sheet material having expansible characteristics, and having ribs formed integrally therefrom and extending lengthwise thereof, and having openings on the ribs, the walls of the openings being adapted to engage the walls of an aperture in a structure through which the fastener is adapted to be passed.

5. A fastening device comprising a hollow, expansible sheet metal body having diamond shaped openings therein, said openings having one axis thereof extending lengthwise of the body, and the walls of the openings being adapted to engage the walls of an aperture in a structure through which the fastener is adapted to be passed.

6. A fastening device comprising a hollow expansible sheet metal body having spaced openings disposed adjacent one end thereof, and adapted to engage the walls of an aperture in a support to which the fastener is adapted to be attached, said openings having a straight portion, and all of the straight portions being disposed in a common plane extending substantially parallel to one end of the body.

7. A fastening device comprising a sheet metal expansible body, having means formed integrally therewith adjacent one end thereof for engaging the walls of an aperture in a structure to which the fastener is adapted to be attached, and having inturned prongs at the opposite end thereof for engaging an article that is adapted to be passed through the fastener, whereby the fastener is automatically locked against the structure and against the article that is inserted therethrough, and operates to fasten the two articles together.

8. A fastening device comprising a hollow sheet metal expansible body having triangular shaped openings therein, the walls of which are adapted to engage an article, said openings being spaced at substantially the same distance from one end of the body, and said body having ribs extending longitudinally thereof and on opposite sides of the openings, and having indented portions at one end thereof for engaging an article that is passed through the fastener, said last named article operating to expand the fastener, whereby the fastener operates to hold the two articles together.

9. A fastening device comprising a hollow expansible sheet metal body having a D-shaped cross section and having spaced ribs extending longitudinally thereof, and means on the ribs for engaging an article through which the fastener is adapted to be passed and for holding the fastener in self-sustaining position on the article.

10. A fastening device comprising a hollow sheet metal expansible body adapted to be passed through an opening in a support, and having spaced shoulders formed therefrom at one end thereof for engaging the support and holding the fastener in self-sustaining position thereon, some of said shoulders comprising protuberances projecting out of the plane of the body, and having an inturned portion at the opposite end for engaging an article that is adapted to be passed through the fastener, whereby the fastener is automatically locked against the support and against an article that is inserted therethrough and operates to fasten the article to the support.

11. A fastening device comprising a hollow sheet metal expansible body having shoulders formed therefrom at one end thereof for engaging the top and bottom surfaces of an article having an aperture therein through which the fastener is adapted to be passed, said shoulders comprising rows of spaced protuberances, and having an inturned portion at the opposite end for engaging an article that is adapted to be passed through the fastener, whereby the fastener is automatically locked against the article through which it is passed and whereby it is automatically locked against the article that is inserted therethrough and operates to fasten the two articles together.

12. A fastening device comprising a hollow sheet metal expansible body having shoulders formed therefrom for engaging the top and bottom surfaces of an article having an aperture therein through which the fastener is adapted to be passed, said shoulders comprising spaced annular ribs.

13. A fastening device comprising a hollow sheet metal expansible body having shoulders formed therefrom adjacent one end thereof for engaging the top and bottom surfaces of an article having an aperture therein through which the fastener is adapted to be passed, at least some of the shoulders comprising spaced protuberances, and other shoulders comprising spaced fingers that project outwardly from the body of the fastener, and said body having an inturned portion at the opposite end for engaging an article that is adapted to be passed through the fastener, whereby the fastener is automatically locked against the article through which it is passed and is also automatically locked against the article which is inserted therethrough.

14. A fastening device comprising a hollow sheet metal expansible body having shoulders formed therefrom adjacent one end thereof for engaging the top and bottom surfaces of an article having an aperture therein through which the fastener is adapted to be passed, at least one of the shoulders comprising an annular rib and another shoulder comprising a finger that projects outwardly from the body of the fastener, and said body having an inturned portion adjacent the opposite end for engaging an article that is adapted to be passed through the fastener, whereby the fastener is automatically locked against the article through which it passes, and is also automatically locked against the article which is inserted therethrough.

15. A fastening device comprising a hollow sheet metal body having triangular shape, and having spaced shoulders formed therein adjacent the inner sections of the faces of the body, and having other means formed therefrom for gripping and holding an article that extends into the body.

GEORGE A. HANSMAN.
GEORGE A. TINNERMAN.